(12) United States Patent
Li et al.

(10) Patent No.: US 11,269,205 B2
(45) Date of Patent: Mar. 8, 2022

(54) DISPLAY PANEL WITH CHARGING CONTROL AS WELL AS LIQUID CRYSTAL DISPLAY AND CONTROL METHOD ASSOCIATED THEREWITH

(71) Applicants: Beijing BOE Optoelectronics Technology Co., Ltd., Beijing (CN); BOE Technology Group Co., Ltd., Beijing (CN)

(72) Inventors: Yan Li, Beijing (CN); Bo Gao, Beijing (CN); Wei Sun, Beijing (CN); Yang Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 194 days.

(21) Appl. No.: 16/317,630

(22) PCT Filed: May 31, 2018

(86) PCT No.: PCT/CN2018/089118
§ 371 (c)(1),
(2) Date: Jan. 14, 2019

(87) PCT Pub. No.: WO2019/041924
PCT Pub. Date: Mar. 7, 2019

(65) Prior Publication Data
US 2020/0355952 A1  Nov. 12, 2020

(30) Foreign Application Priority Data

Aug. 30, 2017 (CN) .......................... 201710765604.9

(51) Int. Cl.
*G02F 1/133* (2006.01)
*G02F 1/1333* (2006.01)
(Continued)

(52) U.S. Cl.
CPC ........ *G02F 1/13306* (2013.01); *G02F 1/1368* (2013.01); *G02F 1/13338* (2013.01);
(Continued)

(58) Field of Classification Search
CPC combination set(s) only.
See application file for complete search history.

(56) References Cited

U.S. PATENT DOCUMENTS

2009/0115750 A1  5/2009  Chen et al.
2011/0037747 A1*  2/2011  Lee ...................... G09G 3/3677
                                            345/211
(Continued)

FOREIGN PATENT DOCUMENTS

| CN | 101430466 A | 5/2009 |
| CN | 103018994 A | 4/2013 |

(Continued)

OTHER PUBLICATIONS

International Search Report and Written Opinion of the International Searching Authority (with English language translation of Written Opinion), International Application No. PCT/CN2018/089118, dated Sep. 6, 2018, 13 pp.
(Continued)

*Primary Examiner* — Lauren Nguyen
(74) *Attorney, Agent, or Firm* — Myers Bigel, P.A.

(57) ABSTRACT

The present disclosure provides a charging control method for a display panel, including the following steps: controlling a source charging voltage waveform provided by a data line when touch and display on the display panel are simultaneously performed to enable the source charging voltage waveform to consistently vary with a voltage waveform of a common electrode of the display panel. The present disclosure further provides a display panel and a liquid crystal display.

8 Claims, 3 Drawing Sheets

(51) Int. Cl.
*G02F 1/1362* (2006.01)
*G02F 1/1368* (2006.01)
*G06F 3/041* (2006.01)

(52) U.S. Cl.
CPC ...... *G02F 1/136286* (2013.01); *G06F 3/0416* (2013.01); *G02F 2201/121* (2013.01); *G06F 3/0412* (2013.01)

(56) References Cited

U.S. PATENT DOCUMENTS

| | | |
|---|---|---|
| 2013/0176199 A1 | 7/2013 | Lee |
| 2013/0314343 A1 | 11/2013 | Cho et al. |
| 2014/0320446 A1 | 10/2014 | Kim et al. |
| 2015/0035766 A1* | 2/2015 | Chung .................. G06F 3/0445 345/173 |
| 2016/0147348 A1* | 5/2016 | Liu ...................... G06F 3/04164 345/173 |
| 2016/0204166 A1 | 7/2016 | Yang |
| 2016/0343326 A1 | 11/2016 | Li et al. |
| 2017/0090643 A1 | 3/2017 | Kim et al. |
| 2018/0136778 A1 | 5/2018 | Choi et al. |

FOREIGN PATENT DOCUMENTS

| | | |
|---|---|---|
| CN | 103424909 A | 12/2013 |
| CN | 104133601 A | 11/2014 |
| CN | 104217679 A | 12/2014 |
| CN | 104345490 A | 2/2015 |
| CN | 104571701 A | 4/2015 |
| CN | 106128374 A | 11/2016 |
| CN | 106557195 A | 4/2017 |
| CN | 107369423 A | 11/2017 |
| KR | 10-2014-0083633 A | 7/2014 |
| WO | 2012/036528 A2 | 3/2012 |
| WO | 2016195388 A1 | 12/2016 |

OTHER PUBLICATIONS

First Office Action and English language translation, CN Application No. 201710765604.9, dated Apr. 26, 2019, 16 pp.
"Communication with Supplementary European Search Report", EP Application No. 18826909.6, dated May 7, 2021, 8 pp.

* cited by examiner

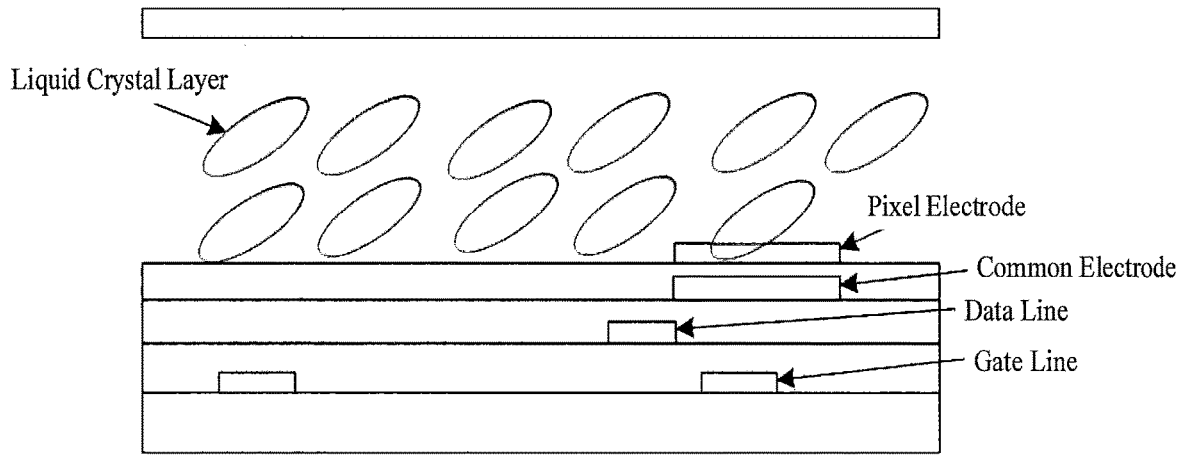
Fig. 1
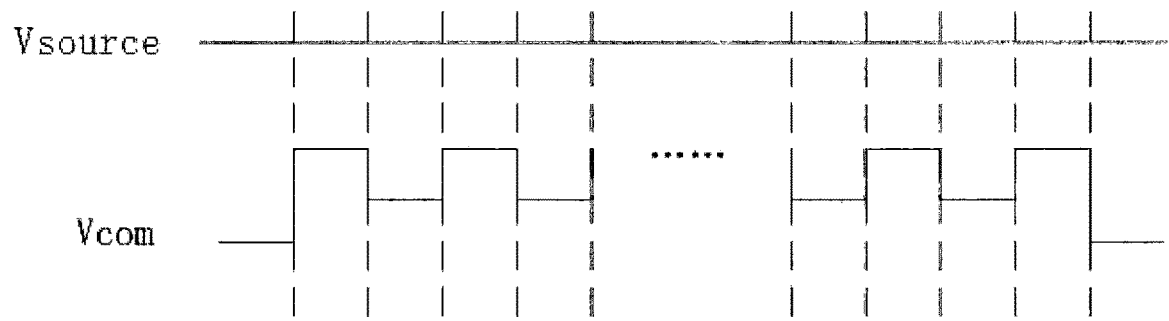
Fig. 2
When Touch And Display On The Display Panel Are Simultaneously Performed, Source Charging Voltage Waveform Provided By The Data Line Is Controlled So That The Source Charging Voltage Waveform Varies With A Voltage Waveform Of The Common Electrode Of The Display Panel — S1
Fig. 3

DISPLAY PANEL WITH CHARGING CONTROL AS WELL AS LIQUID CRYSTAL DISPLAY AND CONTROL METHOD ASSOCIATED THEREWITH

CROSS REFERENCE TO RELATED APPLICATIONS

The present application is a 35 U.S.C. 371 national stage application of PCT International Application No. PCT/CN2018/089118, filed on May 31, 2018, which claims the benefit of Chinese Patent Application No. 201710765604.9, filed on Aug. 30, 2017, the contents of which are incorporated herein by reference in their entireties.

FIELD

The present disclosure relates to the field of display control technologies, and in particular, to a charging control method for a display panel, a display panel, and a liquid crystal display.

BACKGROUND ART

Touch panels may be classified into add-on-mode touch panels, on-cell touch panels and in-cell touch panels according to their compositional structures, wherein the in-cell touch panel, with a touch electrode of the touch panel being disposed in a liquid crystal display screen, may reduce thickness of the whole module as well as fabrication costs of the touch panel. The touch panels may be classified into resistive touch panels and capacitive touch panels according to working principles, wherein the capacitive touch panel supports a multi-point touch function, exhibits higher light transmittance and lower overall power consumption, and its contact surface has high hardness and a longer service life. Therefore, currently capacitive in-cell touch panels are mostly employed.

SUMMARY

An embodiment of the first aspect of the present disclosure provides a charging control method for a display panel, comprising the following steps: controlling a waveform of a source charging voltage provided by a data line in response to simultaneous performance of touch and display on the display panel to enable the waveform of the source charging voltage waveform to vary with a voltage waveform of a common electrode of the display panel.

According to an embodiment of the present disclosure, the waveform of the source charging voltage is controlled such that the waveform of the source charging voltage remains substantially consistent with the waveform of the voltage of the common electrode.

According to an embodiment of the present disclosure, the waveform of the source charging voltage is controlled such that the waveform of the source charging voltage and the waveform of the voltage of the common electrode remain consistent after one of them lags a period of time, wherein the lag, as compared with no lag, does not change a voltage difference at the moment when a transistor of a pixel dot of the display panel is turned off.

An embodiment of the second aspect of the present disclosure provides a display panel, comprising: a first voltage supply circuit for supplying a voltage waveform to a common electrode of the display panel; a second voltage supply circuit for providing a source charging voltage waveform to a data line of the display panel; an adjusting circuit being connected to the first voltage supply circuit and the second voltage supply circuit and configured to control a waveform of the source charging voltage to enable the waveform of the source charging voltage to vary with a waveform of the voltage of the common electrode when touch and display on the display panel are simultaneously performed.

According to an embodiment of the present disclosure, the adjusting circuit is further configured to control the second voltage supply circuit to adjust the waveform of the source charging voltage according to the voltage supplied by the first voltage supply circuit, to enable the waveform of the source charging voltage to remain substantially consistent with the waveform of the voltage of the common electrode.

According to an embodiment of the present disclosure, the adjusting circuit is further configured to control the second voltage supply circuit to adjust the waveform of the source charging voltage according to the voltage supplied by the first voltage supply circuit such that the waveform of the source charging voltage and the waveform of the voltage of the common electrode remain consistent after one of them lags a period of time, wherein the lag, as compared with no lag, does not change a voltage difference at the moment when a transistor of a pixel dot of the display panel is turned off.

According to an embodiment of the present disclosure, a transistor is arranged at each of pixel dots correspondingly. The transistors are in a plurality of columns so that a plurality of columns of pixel dots correspond to the plurality of columns of transistors, sources of each column of said transistors are connected to a data line, and drains of each column of said transistors are connected to the common electrode.

In addition, embodiments of the present disclosure further provide a liquid crystal display including the above display panel.

BRIEF DESCRIPTION OF THE DRAWINGS

FIG. 1 is a schematic structural view of a capacitive in-cell display panel in the related art.

FIG. 2 is a waveform diagram of a data voltage and a common electrode voltage of a capacitive in-cell display panel in the related art.

FIG. 3 is a flow chart of a charging control method for a display panel according to an embodiment of the present disclosure.

DETAILED DESCRIPTION

Figure 4A:
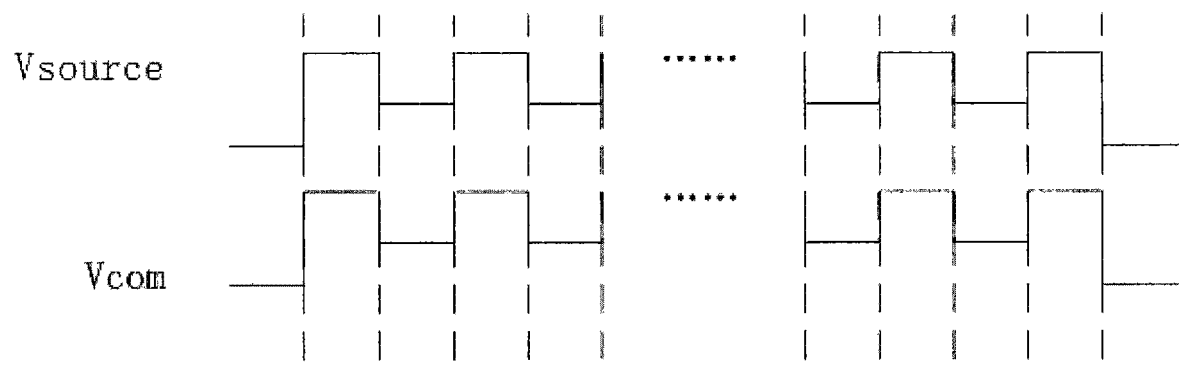
FIG. 4a is a waveform diagram of a source charging voltage and a common electrode voltage of a display panel according to an embodiment of the present disclosure.

Embodiments of the present disclosure are described in detail below, and examples of the embodiments are illustrated in the figures, wherein the same or similar reference numerals are used to represent the same or similar elements or elements having the same or similar functions throughout the text. The embodiments described below with reference to the figures are exemplary and intended to illustrate the present disclosure, and cannot be construed as limiting the present disclosure.

A charging control method for a display panel, a display panel and a liquid crystal display proposed according to embodiments of the present disclosure will be described below with reference to the figures.

Before describing the charging control method of the display panel of the embodiments of the present disclosure, the technical problem to be solved by the present disclosure will be described in detail in conjunction with a specific example.

FIG. 1 is a schematic structural view of a capacitive in-cell display panel in the related art. As shown in FIG. 1, the capacitive in-cell display panel may include an array substrate and a liquid crystal layer. The array substrate comprises a gate line, a data line, a common electrode, a pixel electrode, and a TFT device (not shown) between the common electrode and the pixel electrode, wherein the common electrode, the pixel electrode and the TFT device constitute a pixel dot.

Generally, in order to realize the display and touch function of the display panel, the common electrode may be used as a multiplex electrode, which on the one hand, acts as a common electrode to provide a reference voltage for the picture display of the display panel, and on the other hand, acts as a touch electrode to provide a touch drive voltage for the touch function of the display panel. Specifically, when the display panel operates, an external IC outputs a data signal to the data line to perform lighting control for the pixel dots, and simultaneously supplies power to the common electrode, and helps to realize the display function and touch function of the display panel under effect of the voltage of the common electrode.

However, usually, when display and touch are simultaneously performed, during the charging of the pixel dots, as shown in FIG. 2, since the common electrode is touched by the human body, its voltage Vcom will continuously change. If the data voltage Vsource remains unchanged at this time, a voltage difference between Vsource and Vcom changes continuously when the pixel dots are charged, thereby causing insufficient charging of the pixel dots and failure to ensure consistency of charging, and in turn affecting the displaying effect. Therefore, the present disclosure proposes a charging control method of the display panel in view of this technical problem.

FIG. 3 is a flow chart of a charging control method for a display panel according to an embodiment of the present disclosure. As shown in FIG. 3, the charging control method of the display panel of the embodiment of the present disclosure may include the following steps:

S1: when touch and display on the display panel are simultaneously performed, a source charging voltage waveform provided by a data line is controlled so that the source charging voltage waveform varies with a voltage waveform of the common electrode of the display panel.

According to an embodiment of the present disclosure, the source charging voltage waveform is adjusted such that the source charging voltage waveform remains consistent with the voltage waveform of the common electrode. When the voltage waveform of the common electrode is at a high level, the source charging voltage waveform is correspondingly a high level, and when the voltage waveform of the common electrode is at a low level, the source charging voltage waveform is correspondingly a low level.

Further, during the charging of each of pixel dots, the voltage difference between the voltage of the common electrode and the source charging voltage remains unchanged at the moment when the transistor of each pixel dot is turned off.

Specifically, the display panel shown in FIG. 1 is again taken as an example. When the display panel operates, the waveform of the voltage supplied by the external IC to the common electrode remains unchanged, but the data voltage Vsource (namely, the source charging voltage) output by the external IC no longer maintains in an initial constant state, but varies with the voltage Vcom of the common electrode. Specifically, when display and touch are simultaneously performed, the external IC supplies power to the common electrode, and meanwhile detects the voltage Vcom of the common electrode in real time, wherein in the case of no human body touch, the voltage Vcom of the common electrode is the same as the voltage supplied by the external IC; but in the case of human body touch, the voltage Vcom of the common electrode will change. If the data voltage Vsource remains unchanged at this time, the consistency of charging will be affected. Hence, upon outputting the data voltage Vsource, the external IC may calculate and then output the currently-desired data voltage Vsource according to the voltage Vcom of the common electrode and in conjunction with the data voltage required in a normal situation. As such, even if the human body touch causes the voltage Vcom of the common electrode to change, since the data voltage Vsource varies with the common electrode voltage Vcom, the voltage difference between the data voltage Vsource and the common electrode voltage Vcom may be effectively maintained so that the pixel charging is not affected by touch, thereby ensuring the display effect of the display panel.

Figure 4B:
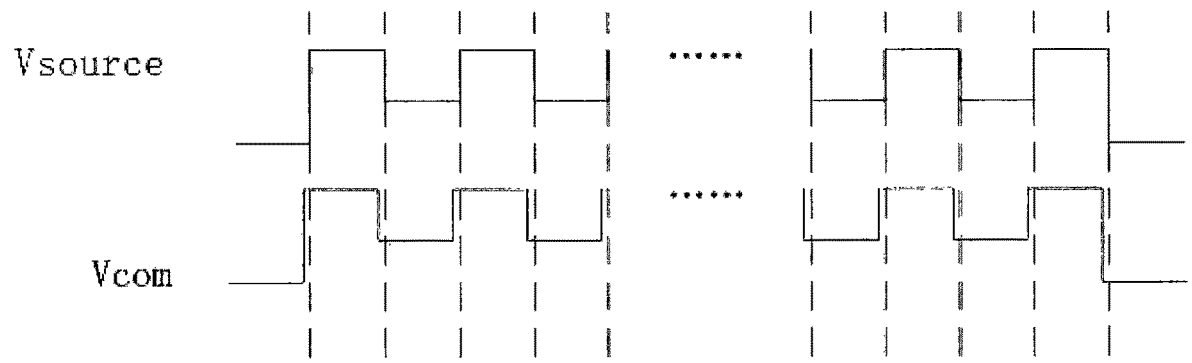
FIG. 4b is a waveform diagram of a source charging voltage and a common electrode voltage of a display panel according to another embodiment of the present disclosure.

Upon actual control, as shown in FIG. 4a, the data voltage Vsource may remain consistent with the voltage Vcom of the common electrode, that is, when the voltage Vcom of the common electrode is at a high level, the data voltage Vsource is at a high level, and when the voltage Vcom of the common electrode is at a low level, the data voltage Vsource is at a low level, and then the voltage difference between the data voltage Vsource and the common electrode voltage Vcom remains unchanged. In addition, there may be a certain tiny time difference between consistent waveforms of the data voltage Vsource and the common electrode voltage Vcom. For example, as shown in FIG. 4b, a rising edge of the voltage Vcom of the common electrode is ahead of the data voltage Vsource, and a falling edge of the voltage Vcom of the common electrode is ahead of the data voltage Vsource. Certainly, the rising edge of the voltage Vcom of the common electrode may also lag behind the data voltage Vsource, and the falling edge may also lag behind the data voltage Vsource, etc., as long as the same voltage difference is kept at the moment when the transistor of the pixel dot is turned off.

Therefore, in a charging control method of the display panel according to embodiments of the present disclosure, when touch and display on the display panel are simultaneously performed, a waveform of the source charging voltage provided by the data line is controlled to vary with the voltage waveform of the common electrode of the display panel, so that the charging of each of pixel dots on the display panel is not affected by the touch, thereby effectively improving the charging performance and improving the picture quality.

Figure 5:
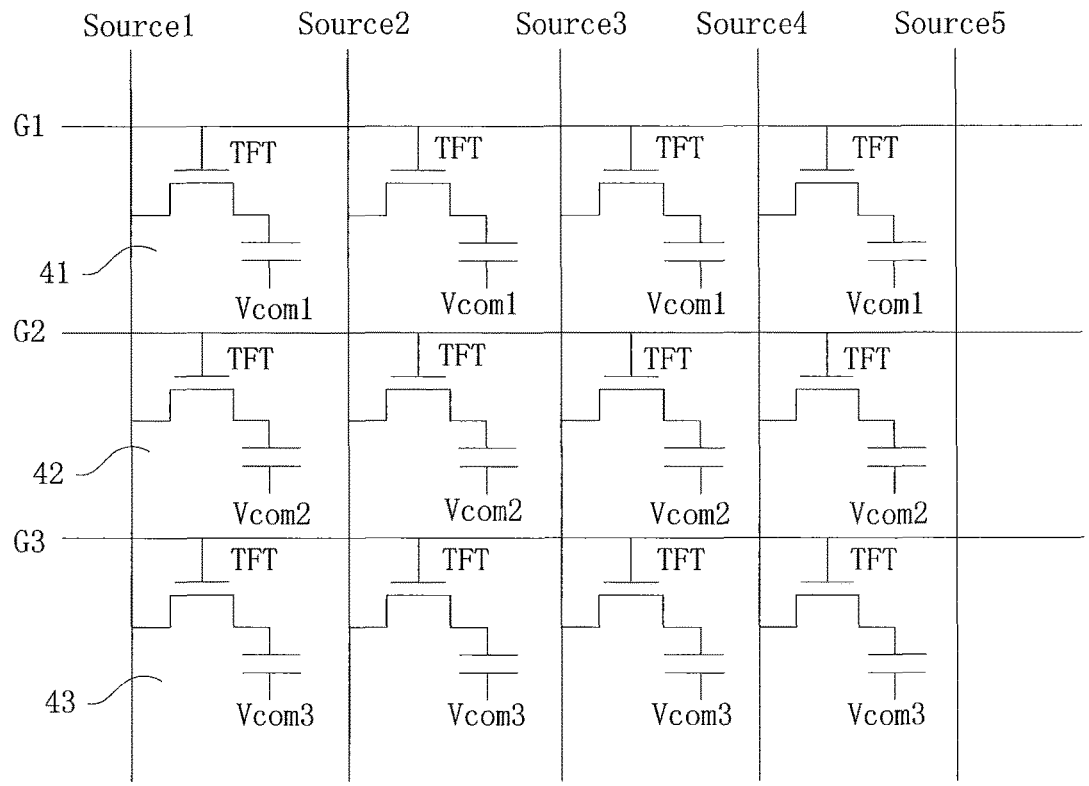
FIG. 5 is a circuit structural diagram of pixel dots according to an embodiment of the present disclosure.

Further, according to an embodiment of the present disclosure, as shown in FIG. 5, a transistor is arranged at each pixel dot correspondingly. The transistors are in a plurality of columns, sources of each column of transistors are connected to a data line, and drains of each column of transistors are connected to the common electrode.

Specifically, in practical design, the common electrode corresponding to each row of pixel dots may employ a whole piece of electrode, or employ multiple pieces of electrodes electrically connected together, wherein a source of a transistor (TFT) in each pixel dot is connected with a corresponding data line such as Source 1, a gate thereof is connected with a corresponding gate line such as G1, and a drain thereof is connected to respective corresponding common electrode such as Vcom1 through a charging capacitor.

When the display panel operates, the external IC supplies power to the common electrode, and at the same time, calculates the data voltage, namely, the source charging voltage, which is desired to be output currently, according to the detected common electrode voltage and the data voltage required in normal display, and outputs the voltage to the data line. As such, the voltage difference between the source charging voltage of the transistor and the common electrode voltage remains substantially consistent, so that the charging of each pixel dot on the display panel is consistent, the charging problem is effectively addressed, and the picture quality is enhanced.

It should be noted that "remaining substantially consistent" herein refers to two cases as shown in FIG. 4a or FIG. 4b, that is, considering the actual operation accuracy situation, the waveforms are unlikely to remain exactly consistent, and might temporally stagger a tiny period of time.

It should also be noted that FIG. 1 is only one example of the application of the present disclosure. The charging control method of the present disclosure may also be applied to display panels having other structures, for example, to a display panel in which touch electrodes are provided on the side of a color filter substrate (CF). The display panels are not limited hereto.

In general, in a charging control method for a display panel according to embodiments of the present disclosure, when touch and display on the display panel are simultaneously performed, a waveform of the source charging voltage provided by the data line is controlled so that the source charging voltage waveform varies with the voltage waveform of the common electrode of the display panel, so that the charging of each pixel dot on the display panel is not affected by the touch, thereby effectively improving the charging performance and improving the picture quality.

Figure 6:
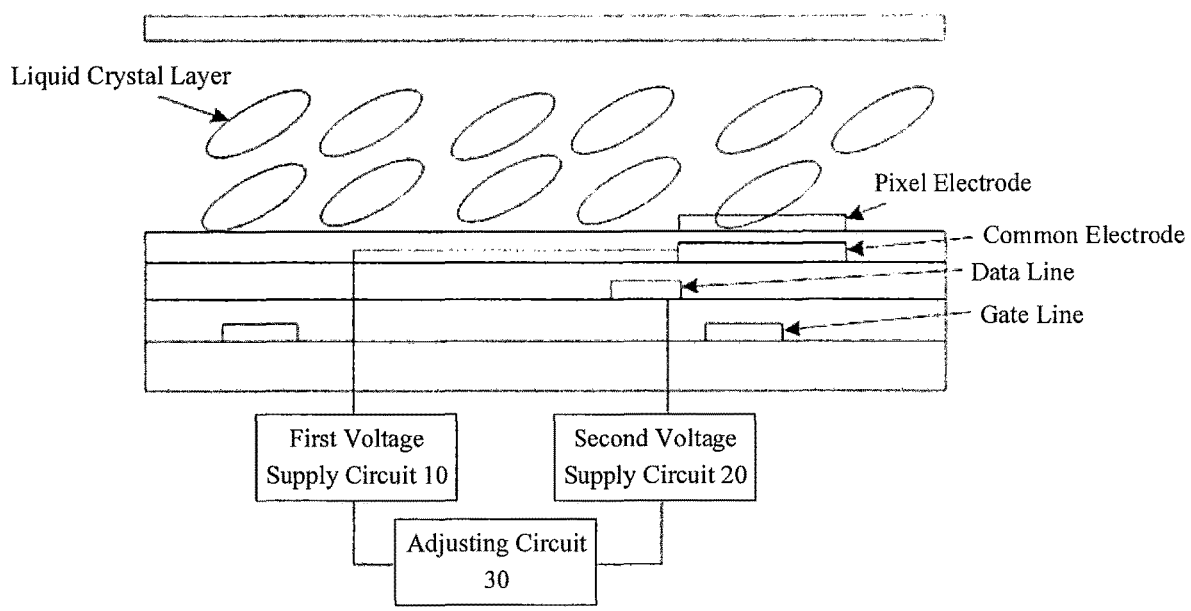
FIG. 6 is a schematic structural view of a display panel according to an embodiment of the present disclosure.

FIG. 6 is a schematic structural view of a display panel according to an embodiment of the present disclosure. As shown in FIG. 6, the display panel may include a first voltage supply circuit 10, a second voltage supply circuit 20, and an adjustment circuit 30.

The first voltage supply circuit 10 is configured to supply a voltage waveform to a common electrode of the display panel, and the second voltage supply circuit 20 is configured to provide a source charging voltage waveform to a data line of the display panel. The adjustment circuit 30 is configured to, when touch and display on the display panel are simultaneously performed, control the source charging voltage waveform to enable the source charging voltage waveform to vary with the voltage waveform of the common electrode.

According to an embodiment of the present disclosure, the adjustment circuit 30 is further configured to control the second voltage supply circuit 20 to adjust the source charging voltage waveform such that the source charging voltage waveform remains substantially consistent with the voltage waveform of the common electrode. When the voltage waveform of the common electrode is at a high level, the source charging voltage waveform is correspondingly at a high level, and when the voltage waveform of the common electrode is at a low level, the source charging voltage waveform is correspondingly at a low level.

Further, during the charging of each pixel dot, the voltage difference between the voltage of the common electrode and the source charging voltage remains unchanged at the moment when the transistor of that pixel dot is turned off.

Specifically, as shown in FIG. 6, when the display panel operates, the voltage waveform supplied by the first voltage supply circuit 10 to the common electrode remains unchanged, but the data voltage Vsource (namely, the source charging voltage) output by the second voltage supply circuit 20 no longer maintains in an initial constant state, but varies with the voltage Vcom of the common electrode. Specifically, when the display and the touch are simultaneously performed, the first voltage supply circuit 10 supplies power to the common electrode, and meanwhile detects the voltage Vcom of the common electrode in real time. In the case of no human body touch, the voltage Vcom of the common electrode is the same as the voltage supplied by the first voltage supply circuit 10; but in the case of human body touch, the voltage Vcom of the common electrode will change. If the data voltage Vsource supplied by the second voltage supply circuit 20 remains unchanged at this time, the consistency of charging will be affected. Hence, when the second voltage supply circuit 20 outputs the data voltage Vsource, the adjusting circuit 30 may calculate a currently-desired data voltage Vsource according to the voltage Vcom of the common electrode and in conjunction with the data voltage required in a normal situation, and then control the second voltage supply circuit 20 to output the currently-desired data voltage Vsource. As such, even if the human body touch causes the voltage Vcom of the common electrode to change, since the data voltage Vsource varies with the common electrode voltage Vcom, the voltage difference between the data voltage Vsource and the common electrode voltage Vcom may be effectively maintained so that the pixel charging is not affected by the touch, thereby ensuring the display effect of the display panel.

Upon actual control, as shown in FIG. 4a, the data voltage Vsource may remain consistent with the voltage Vcom of the common electrode, that is, when the voltage Vcom of the common electrode is at a high level, the data voltage Vsource is at a high level, when the voltage Vcom of the common electrode is at a low level, the data voltage Vsource is at a low level, and the voltage difference between the data voltage Vsource and the common electrode voltage Vcom remains unchanged. In addition, there may be a certain tiny time difference between consistent waveforms of the data voltage Vsource and the common electrode voltage Vcom. For example, as shown in FIG. 4b, a rising edge of the voltage Vcom of the common electrode is ahead of the data voltage Vsource, and a falling edge of the voltage Vcom of the common electrode is ahead of the data voltage Vsource. Certainly, the rising edge of the voltage Vcom of the common electrode may also lag behind the data voltage Vsource, and the falling edge may also lag behind the data voltage Vsource, etc., as long as the same voltage difference is kept at the moment when the transistor TFT at the pixel dot is turned off.

Therefore, in a display panel according to embodiments of the present disclosure, when touch and display on the display panel are simultaneously performed, the adjusting circuit controls the source charging voltage waveform to vary with the voltage waveform of the common electrode, so that the charging of each pixel dot on the display panel is not affected by the touch, thereby effectively improving the charging performance and improving the picture quality.

Further, according to an embodiment of the present disclosure, as shown in FIG. 5, a transistor TFT is arranged at each of pixel dots (e.g., pixel dots 41, 42 and 43) correspondingly. The transistors TFTs are in a plurality of columns, sources of each column of transistors are connected to a data line (e.g., data line Source1, Source2, . . . ), and drains of each column of transistors TFTs are connected to respective common electrodes (e.g., common electrodes Vcom1, Vcom2, . . . ).

Specifically, in practical design, the common electrode corresponding to each row of pixel dots may employ a whole piece of electrode, or employ multiple pieces of electrodes electrically connected together, wherein a source of the transistor TFT in each pixel dot is connected with a corresponding data line such as Source1, a gate thereof is connected with a corresponding gate line such as G1, and a drain thereof is connected to respective corresponding common electrode such as Vcom1 through a charging capacitor.

When the display panel operates, the first voltage supply circuit 10 supplies power to the common electrode, and the adjusting circuit 30 calculates the data voltage, namely, the source charging voltage, which is desired to be output currently, according to the detected common electrode voltage and the data voltage required for normal display, and outputs the desired voltage to the data line through the second voltage supply circuit 20, so that the voltage difference between the source charging voltage of the transistor TFT and the common electrode voltage remains substantially consistent, so that the charging of each pixel dot on the display panel is consistent. As such, the charging problem is effectively addressed, the picture quality is enhanced, and the touch function can be achieved under effect of the common electrode.

It should be noted that the display panel shown in FIG. 6 is only for illustration purpose, and may specifically employ other structural forms. For example, the touch electrodes may be disposed on the CF side, and a connection manner of the second voltage supply unit 20 is not limited to FIG. 6. The second voltage supply unit 20 may, as shown in FIG. 6, only supply the data voltage, and is only connected with the data line; alternatively, the second voltage supply unit 20 may supply the data line voltage as well as the gate line voltage, whereupon the second voltage supply unit 20 is connected with the data line as well as the gate line. The connection manner is not limited hereto.

Therefore, in a display panel according to embodiments of the present disclosure, when touch and display on the display panel are simultaneously performed, the adjusting circuit controls the source charging voltage waveform to vary with the voltage waveform of the common electrode, so that the charging of each pixel dot on the display panel is not affected by the touch, thereby effectively improving the charging performance and increasing the picture quality.

In addition, embodiments of the present disclosure also propose a liquid crystal display including the abovementioned display panel.

By employing the abovementioned display panel, the liquid crystal display of the embodiments of the present disclosure may ensure that the charging of each pixel dot on the display panel is not affected by the touch, thereby effectively improving the charging performance and increasing the picture quality.

In the description of the present disclosure, it would be appreciated that the terms "first" and "second" are used for descriptive purposes only and cannot be understood as indicating or implying a relative importance or implicitly indicating the number of technical features indicated. Thus, a feature defined by "first" or "second" may explicitly or implicitly include at least one said feature.

In the description of the specification, the description of the terms such as "an embodiment", "example" and "specific example" means that specific features, structures, or characteristics described in connection with the embodiments or examples are included in at least one embodiment or example of the present disclosure. In the present specification, the schematic representation of the above terms is not necessarily directed to the same embodiment or example. Furthermore, the specific features, structures, or characteristics described may be combined in a suitable manner in any one or more embodiments or examples. In addition, in the case of no mutual contradiction, those skilled in the art may merge or combine different embodiments or examples as well as features of different embodiments or examples described in the specification.

While the embodiments of the present disclosure have been shown and described above, it may be understood that the foregoing embodiments are illustrative and cannot be construed as limiting the scope of the present disclosure. Those having ordinary skill in the art may make changes, modifications, substitutions and variations to the above embodiments within the scope of the present disclosure.

The invention claimed is:

1. A display panel, the display panel being an in-cell display panel and comprising:
    a first voltage supply circuit configured to supply a voltage to a common electrode of the display panel, wherein the common electrode of the display panel is configured to act as both a common electrode to provide a reference voltage for a picture display of the display panel and a touch electrode to provide a touch drive voltage;
    a second voltage supply circuit configured to provide a source charging voltage to a data line of the display panel; and
    an adjusting circuit connected to the first voltage supply circuit and the second voltage supply circuit and configured to detect the voltage of the common electrode in real time in response to simultaneously receiving touch and displaying on the display panel, and configured to control a waveform of the source charging voltage according to detected voltage of the common electrode,
    wherein the detected voltage of the common electrode changes in response to the simultaneously receiving touch and displaying on the display panel and when the common electrode is touched by a human touch, and the adjusting circuit is configured to control the waveform of the source charging voltage to vary with the waveform of the detected voltage of the common electrode in response to simultaneous receiving of touch and displaying on the display panel.

2. The display panel according to claim 1, wherein the adjusting circuit is further configured to control the second voltage supply circuit to adjust the waveform of the source charging voltage according to the voltage supplied by the first voltage supply circuit,
    wherein the waveform of the source charging voltage remains substantially consistent with the waveform of the voltage of the common electrode.

3. The display panel according to claim 1, wherein a voltage difference between the voltage of the common electrode and the source charging voltage is configured to remain unchanged in response to turning off a transistor of each of pixel dots on the display panel during the charging.

4. The display panel according to claim 3, wherein a plurality of transistors is arranged at corresponding ones of the pixel dots, wherein a plurality of columns of the pixel dots correspond to a plurality of columns of the plurality of transistors, wherein corresponding sources of each column of the plurality of transistors are connected to a corresponding data line, and wherein corresponding drains of each column of the plurality of transistors are connected to the common electrode.

5. A liquid crystal display comprising the display panel according to claim 1.

6. The liquid crystal display according to claim 5, wherein the adjusting circuit is further configured to control the second voltage supply circuit to adjust the waveform of the source charging voltage according to the voltage supplied by the first voltage supply circuit, wherein the waveform of the source charging voltage remains substantially consistent with the waveform of the voltage of the common electrode.

7. The liquid crystal display according to claim 5, wherein a voltage difference between the voltage of the common electrode and the source charging voltage remains unchanged in response to turning off a transistor of each of pixel dots on the display panel during the charging.

8. The liquid crystal display according to claim 5, wherein a plurality of transistors correspond to ones of a plurality of pixel dots on the display panel, wherein a plurality of columns of the plurality of pixel dots correspond to a plurality of columns of the transistors, wherein corresponding sources of each column of the transistors are connected to a data line, and wherein corresponding drains of ones of the plurality of columns of the transistors are connected to the common electrode.

* * * * *